US012699467B2

(12) United States Patent
Tanaka et al.

(10) Patent No.: US 12,699,467 B2
(45) Date of Patent: *Aug. 4, 2026

(54) ELECTRONIC PEN AND CORE BODY FOR ELECTRONIC PEN

(71) Applicant: Wacom Co., Ltd., Saitama (JP)

(72) Inventors: Kohei Tanaka, Saitama (JP); Takenori Kaneda, Saitama (JP); Hideyuki Hara, Saitama (JP); Noboru Yamaguchi, Saitama (JP); Toru Tsunekawa, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/023,110

(22) Filed: Jan. 15, 2025

(65) Prior Publication Data

US 2025/0155995 A1 May 15, 2025

Related U.S. Application Data

(63) Continuation of application No. 18/492,604, filed on Oct. 23, 2023, now Pat. No. 12,229,352, which is a
(Continued)

(30) Foreign Application Priority Data

May 13, 2021 (JP) ................................. 2021-081590
Apr. 6, 2022 (JP) ................................. 2022-063329

(51) Int. Cl.
*G06F 3/0354* (2013.01)
*G06F 3/038* (2013.01)
*G06F 3/044* (2006.01)

(52) U.S. Cl.
CPC ........ *G06F 3/03545* (2013.01); *G06F 3/0383* (2013.01); *G06F 3/0441* (2019.05); *G06F 3/0442* (2019.05)

(58) Field of Classification Search
CPC .. G06F 3/033; G06F 3/03542; G06F 3/03545; G06F 3/03546;
(Continued)

(56) References Cited

U.S. PATENT DOCUMENTS 3,673,777 A 7/1972 Weber
9,239,639 B1 1/2016 Vanderet et al.
(Continued)

FOREIGN PATENT DOCUMENTS

CN 111837095 A 10/2020
JP 5761773 B1 8/2015
(Continued)

OTHER PUBLICATIONS

English translation of WO-2021184215-A1 (Year: 2021).*
(Continued)

*Primary Examiner* — Nathan Danielsen
(74) *Attorney, Agent, or Firm* — Seed Intellectual Property Law Group LLP

(57) ABSTRACT

An electronic pent includes a case, a core body, and a signal generation circuit. The core body is attached inside the case such that a front end portion in an axial direction protrudes from an opening portion of the case. The signal generation circuit generates a signal to be transmitted from the core body. The core body includes a core rod and a protection member that covers a pen tip portion and an axis portion of the core rod. The core body is provided with a middle portion with a dielectric constant different from a dielectric constant of the protection member, the middle portion being provided around a side surface of the axis portion of the core rod such that the core rod is separated from the protection member.

14 Claims, 8 Drawing Sheets

Related U.S. Application Data continuation of application No. PCT/JP2022/017481, filed on Apr. 11, 2022.

(58) Field of Classification Search
CPC . G06F 3/038–0386; G06F 3/044–0442; G06F 2203/0384
See application file for complete search history.

(56) References Cited

U.S. PATENT DOCUMENTS

| | | | |
|---|---|---|---|
| 9,612,671 B1 | 4/2017 | Blaszczak et al. | |
| 2013/0321355 A1 | 12/2013 | Teiblum | |
| 2015/0160744 A1 | 6/2015 | Mohindra et al. | |
| 2016/0018912 A1 | 1/2016 | Kaneda et al. | |
| 2016/0313812 A1 | 10/2016 | Katsurahira | |
| 2017/0068344 A1 | 3/2017 | Bhandari et al. | |
| 2017/0102792 A1* | 4/2017 | Aoki | G06F 3/03545 |
| 2019/0220108 A1* | 7/2019 | Li | G06F 3/03545 |
| 2020/0050294 A1* | 2/2020 | Hsu | G06F 3/03545 |
| 2021/0089146 A1 | 3/2021 | Hashimoto et al. | |

FOREIGN PATENT DOCUMENTS

| | | | |
|---|---|---|---|
| KR | 1020170029499 A | 3/2017 | |
| WO | WO 2020054163 A1 | 3/2020 | |
| WO | 2020129336 A1 | 6/2020 | |
| WO | WO-2021184215 A1 * | 9/2021 | G06F 3/03546 |

OTHER PUBLICATIONS

English translation of International Search Report, mailed Jul. 12, 2022, for PCT Patent Application No. PCT/JP2022/017481. (2 pages).

Extended European Search Report, dated Jul. 9, 2024, for European Patent Application No. 22807289.8-1218. (7 pages).

* cited by examiner

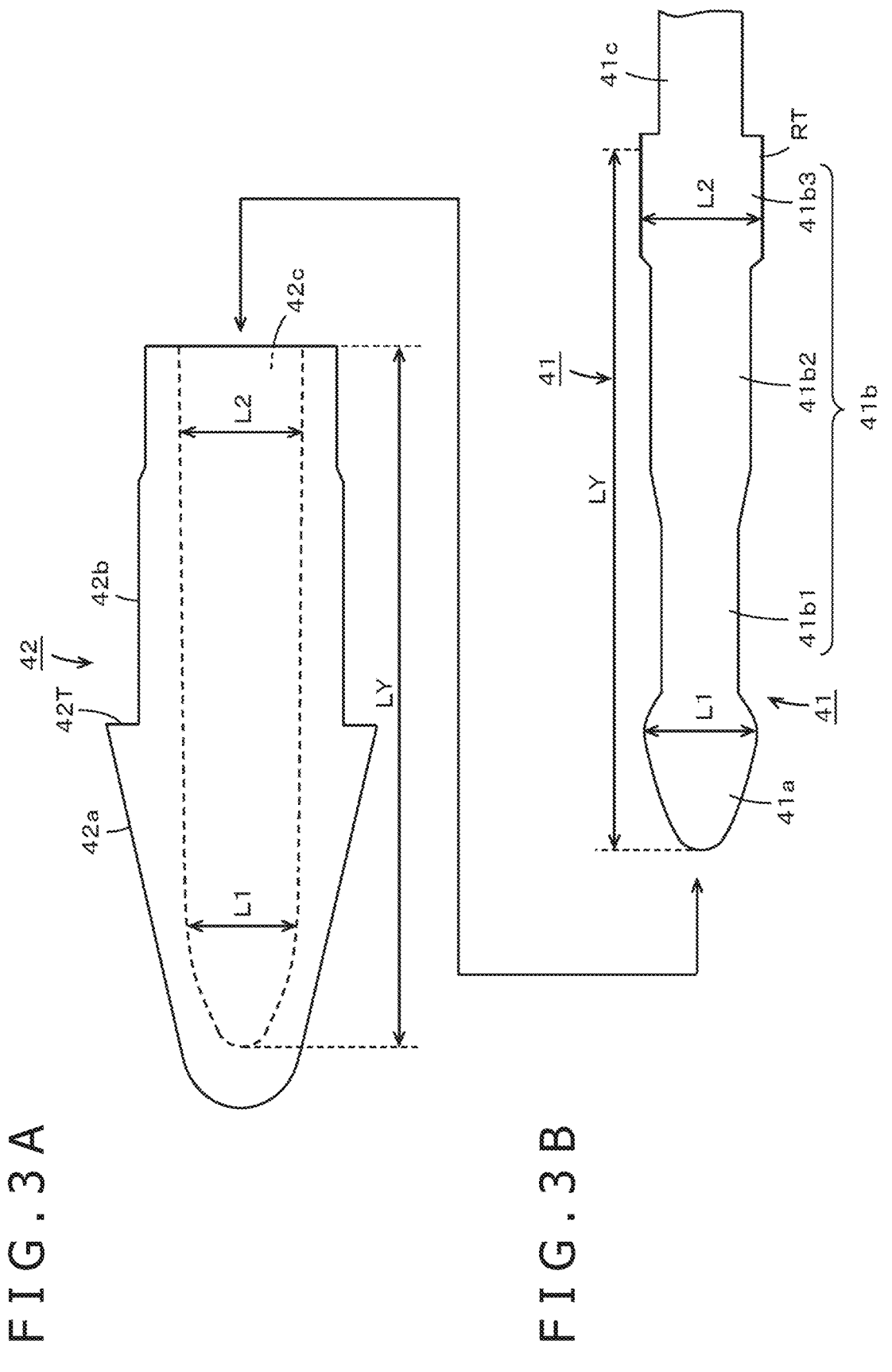
F I G . 3 A
F I G . 3 B

F I G . 4 A
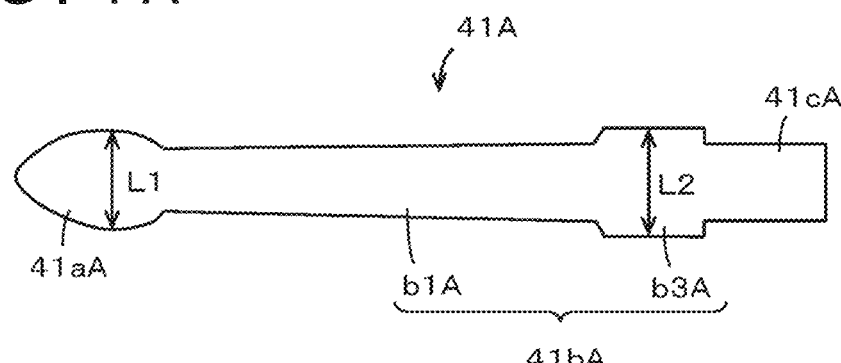
F I G . 4 B
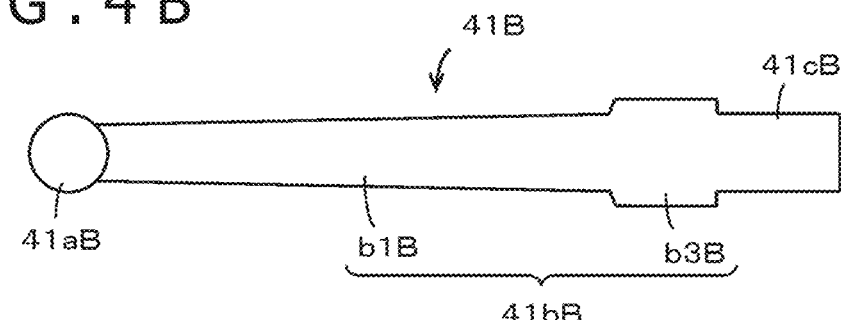
F I G . 4 C
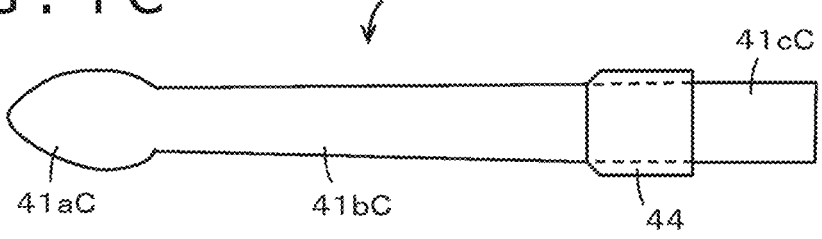

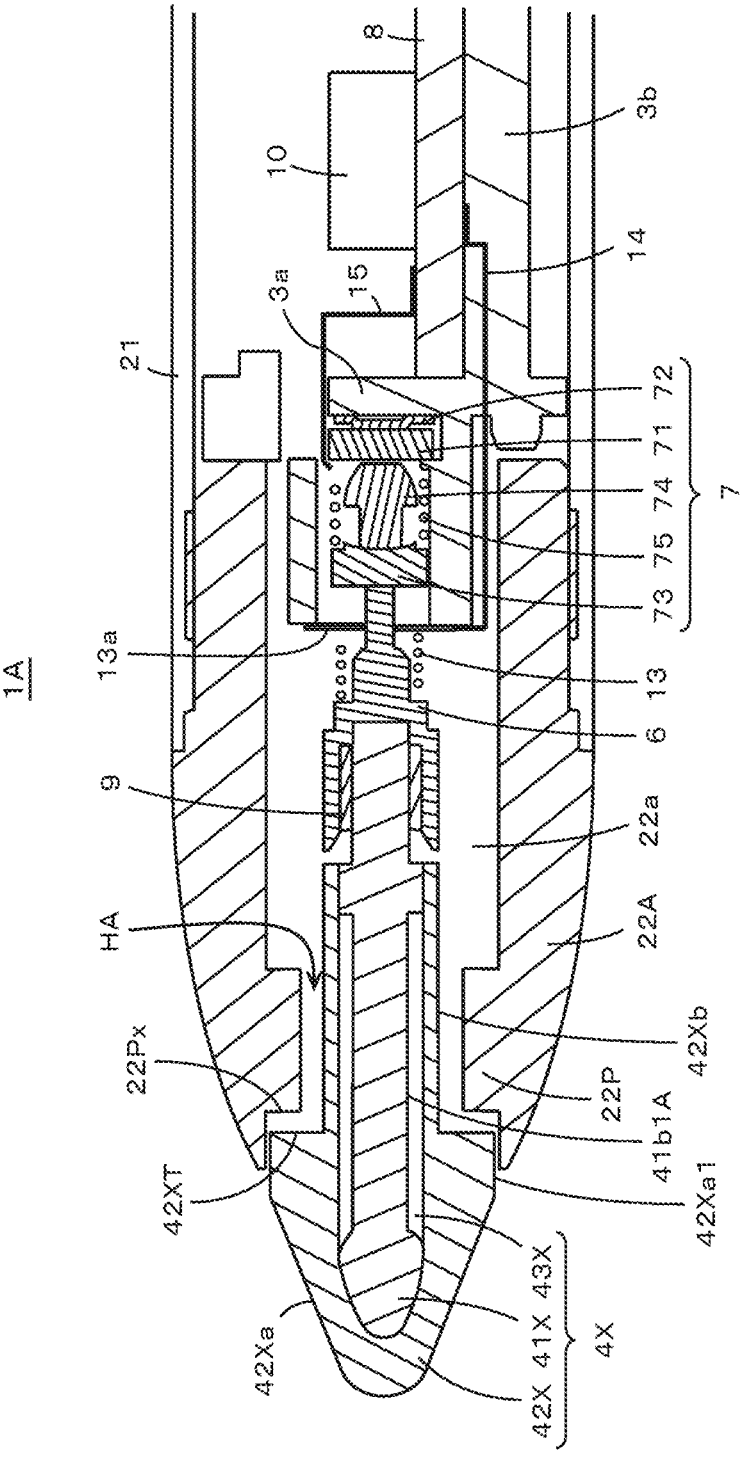
F I G . 6

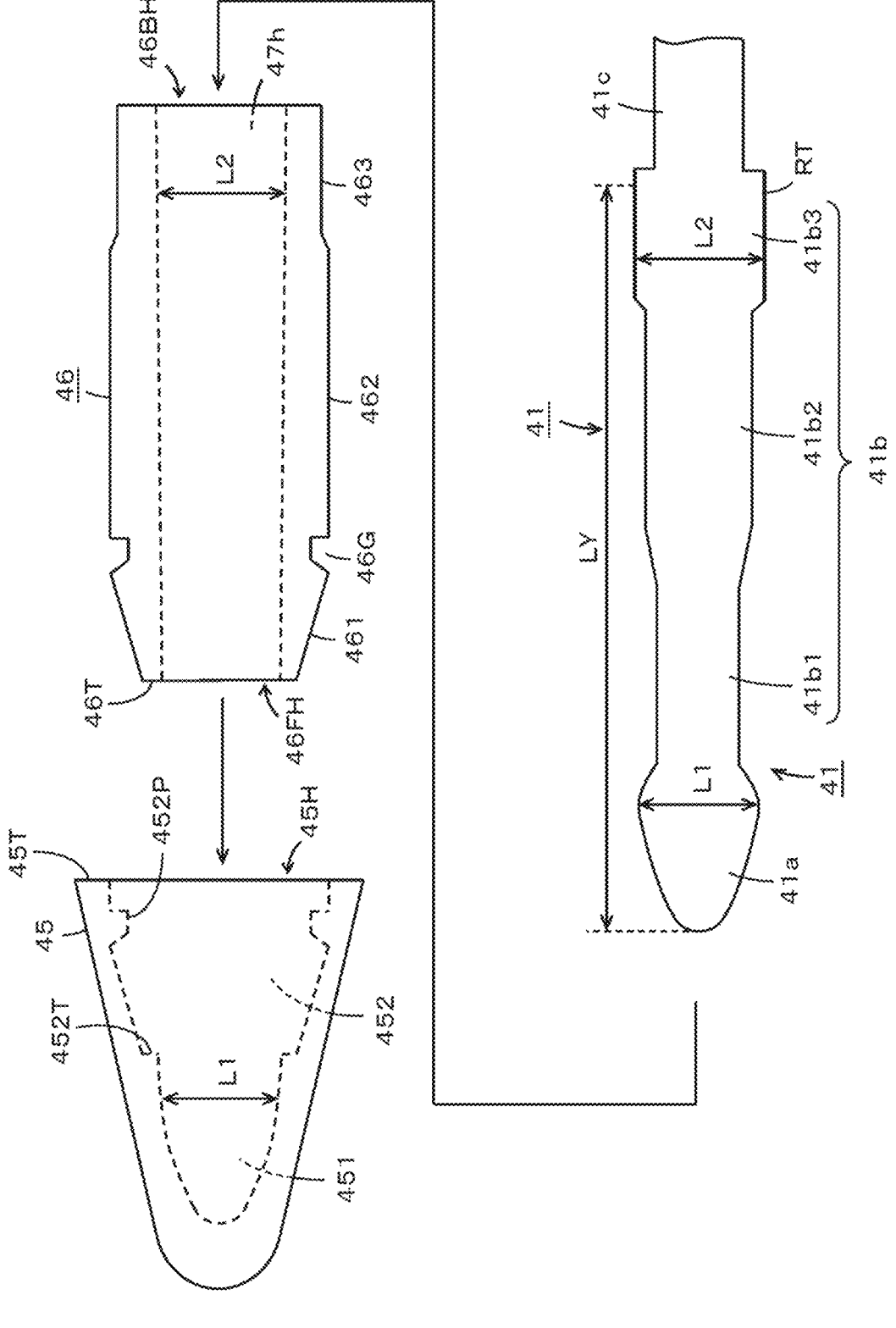
F I G . 7

ELECTRONIC PEN AND CORE BODY FOR ELECTRONIC PEN

BACKGROUND

Technical Field

The disclosure relates to an electronic pen used as a position indicator for a position detection apparatus installed on an information processing apparatus, such as a tablet PC (Personal Computer), and to a core body for an electronic pen used in the electronic pen.

Description of the Related Art

A position detection apparatus and a position indicator are used as input devices of various types of electronic devices, such as a high-performance phone terminal called a smartphone and a tablet PC (Personal Computer). The position indicator is generally formed in a pen shape, and the position indicator is called an electronic pen, a stylus, or the like. There are various types of position detection apparatuses and position indicators. In a case of an active capacitance type (AES (Active Electrostatic) type) among them, a signal from an oscillation circuit installed on the electronic pen is transmitted (emitted) from a pen tip toward a position detection sensor of the position detection apparatus to indicate the position on the position detection sensor.

The position detection sensor used in the position detection apparatus of active capacitance type includes linear transparent electrodes arranged on a display screen of a display apparatus, such as an LCD (Liquid Crystal Display), in an X-axis direction (horizontal direction) and a Y-axis direction (vertical direction) of the display screen. The position detection apparatus detects the position indicated by the electronic pen, according to the positions of the linear transparent electrodes of the position detection sensor that receive the signal (electric field) emitted from the electronic pen.

In the case of the electronic pen of active capacitance type, the signal from a signal generation circuit installed on the electronic pen is transmitted from the pen tip as described above. Therefore, the conventional core body of the electronic pen of active capacitance type is a columnar rod-shaped body, and the entire core body contains a conductive material. In the case of the conventional electronic pen, rippling occurs in the reception signal detected by the position detection apparatus, when the electronic pen is tilted to move the pen tip, and there is a problem that the linear characteristics of the detected indicated position are degraded. This is because the signal (electric field) from the signal generation circuit is emitted not only from the pen tip (front end portion) of the core body of the electronic pen, but also from an axis part of the core body.

That is, the signal (electric field) emitted from the axis part of the core body along with the movement of the electronic pen is received by the linear transparent electrodes of the position detection sensor. In this case, the received signal is strong when the axis part of the core body is over the transparent electrodes, and the received signal is weak when the axis part of the core body is out of the transparent electrodes. As a result, rippling occurs in the reception signal received by the transparent electrodes. This degrades the linear characteristics as detection characteristics of the indicated position when the electronic pen is tilted.

Therefore, to improve the linear characteristics as detection characteristics of the indicated position, a front end portion of the core body can be spherical and the axis part can be as thin as possible in the core body of the electronic pen of active capacitance type, as disclosed in Patent Document 1 described later. In addition, a core rod formed from a conductive material can have a shape becoming gradually narrower from the pen tip side toward the rear end side, and a protection member can cover the surroundings of the core rod to form the core body, as disclosed in Patent Document 2 described later.

PRIOR ART DOCUMENT

Patent Documents

Patent Document 1: Japanese Patent No. 5761773
Patent Document 2: PCT Patent Publication No. WO2020/054163

BRIEF SUMMARY

Technical Problem

In the case of the invention disclosed in Patent Document 1, the conductive axis part is thin, and there is almost no influence of the signal (electric field) emitted from the axis part when the electronic pen is titled. The spherical pen tip is proactively involved in the emission of the signal (electric field), and the range of the reception signal is not enlarged. Therefore, excellent linear characteristics can be obtained. However, to obtain sufficient linear characteristics in the case of the invention disclosed in Patent Document 1, electrode parts at the front end and the rear end need to be connected to each other by the thin axis part, and injection processing needs to be executed with resin that covers the axis part. The manufacturing thus becomes difficult.

In addition, in the case of the invention disclosed in Patent Document 2, the material of the core rod formed from the conductive material can be changed to a soft material to change the feel of writing. In this case, the strength of the core body is reduced, and therefore, the core rod containing the conductive material is wrapped up by the resin to reinforce the core rod. To secure the linearity, the core rod becomes gradually thinner toward the rear end side of the core rod. Therefore, sufficient strength needs to be maintained with use of, for example, the protection member to cover the rear end side of the core rod formed from the conductive material. In addition, the core body of the electronic pen is a part that directly comes in contact with an operation surface. The core body is thin and short with respect to the entire electronic pen, and a desirable strength is necessary. It is also desirable that the core body be easily manufactured.

In view of the above, an object of the disclosure is to realize a core body for an electronic pen and an electronic pen with the core body in which detection characteristics of an indicated position and a tilt are favorable, sufficient strength is maintained, the configuration is simple, and manufacturing is easy.

Technical Solution

To solve the problems, provided is an electronic pen including a cylindrical housing including an opening portion on one end portion in an axial direction of the electronic pen, a core body attached inside the housing such that a front end portion in the axial direction of the electronic pen protrudes from the opening portion of the housing, and a signal generation circuit that, in operation, generates a signal to be transmitted from the core body. The core body includes a core rod with conductivity that, in operation, receives the signal from the signal generation circuit, and a protection member that covers the core rod. The core rod includes a pen tip portion on a front end side, an installation portion on a rear end side, and an axis portion that connects the pen tip portion and the installation portion. The core body includes a middle portion with a dielectric constant different from a dielectric constant of the protection member, the middle portion being provided around a side surface of the axis portion of the core rod such that the core rod is separated from the protection member.

According to this electronic pen, the electronic pen includes the housing, the core body, and the signal generation circuit. The core body is attached inside the housing such that the front end portion in the axial direction protrudes from the opening portion of the housing, and the signal generation circuit generates the signal to be transmitted from the core body. The core body includes the middle portion provided around the axis portion of the core rod and includes the protection member provided around the middle portion. The dielectric constant of the middle portion and the dielectric constant of the protection member are different. Therefore, two layers of capacitors are provided around the axis portion of the core rod. In this state, the signal (electric field) emitted from the axis portion of the core rod is suppressed, and this realizes the electronic pen with favorable characteristics of an indicated position and linearity.

BRIEF DESCRIPTION OF THE SEVERAL VIEWS OF THE DRAWINGS

FIGS. 3A and 3B are diagrams for describing a configuration example of a core body of the electronic pen of the embodiment of the present disclosure.

FIGS. 4A to 4C are diagrams for describing other configuration examples of a core rod of the core body of the electronic pen of the embodiment of the present disclosure.

FIG. 6 is a diagram for describing another configuration example of the electronic pen of the embodiment of the present disclosure.

FIG. 7 is a diagram for describing other configuration examples of the core body of the electronic pen of the embodiment of the present disclosure.

DETAILED DESCRIPTION

Hereinafter, an embodiment of an electronic pen and a core body for the electronic pen according to the disclosure will be described with reference to the drawings. The electronic pen of the embodiment described below is of an active capacitance type that transmits a signal from the electronic pen side and that detects an indicated position according to the position on a position detection sensor that has received the signal.

Configuration Example of Electronic Pen of Active Capacitance Type

Figure 1:
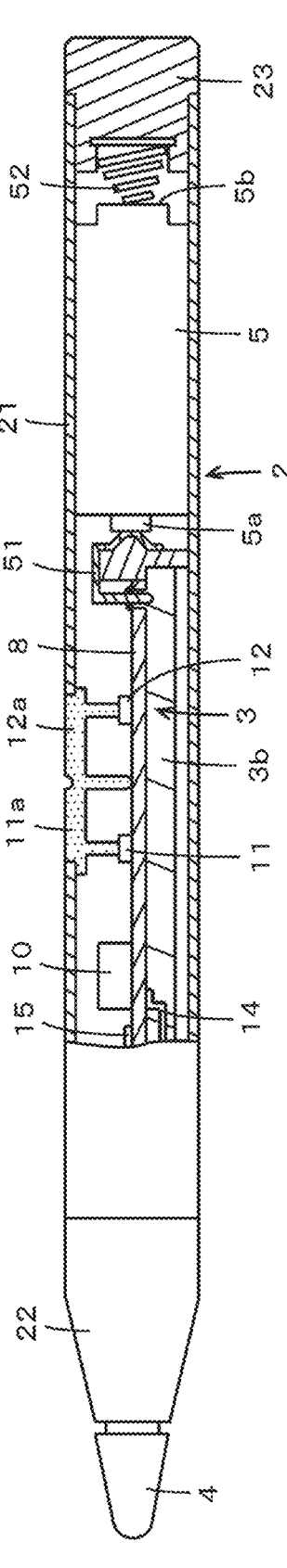
FIG. 1 is a diagram for describing a configuration example of an electronic pen of an embodiment of the present disclosure.
Figure 2A:
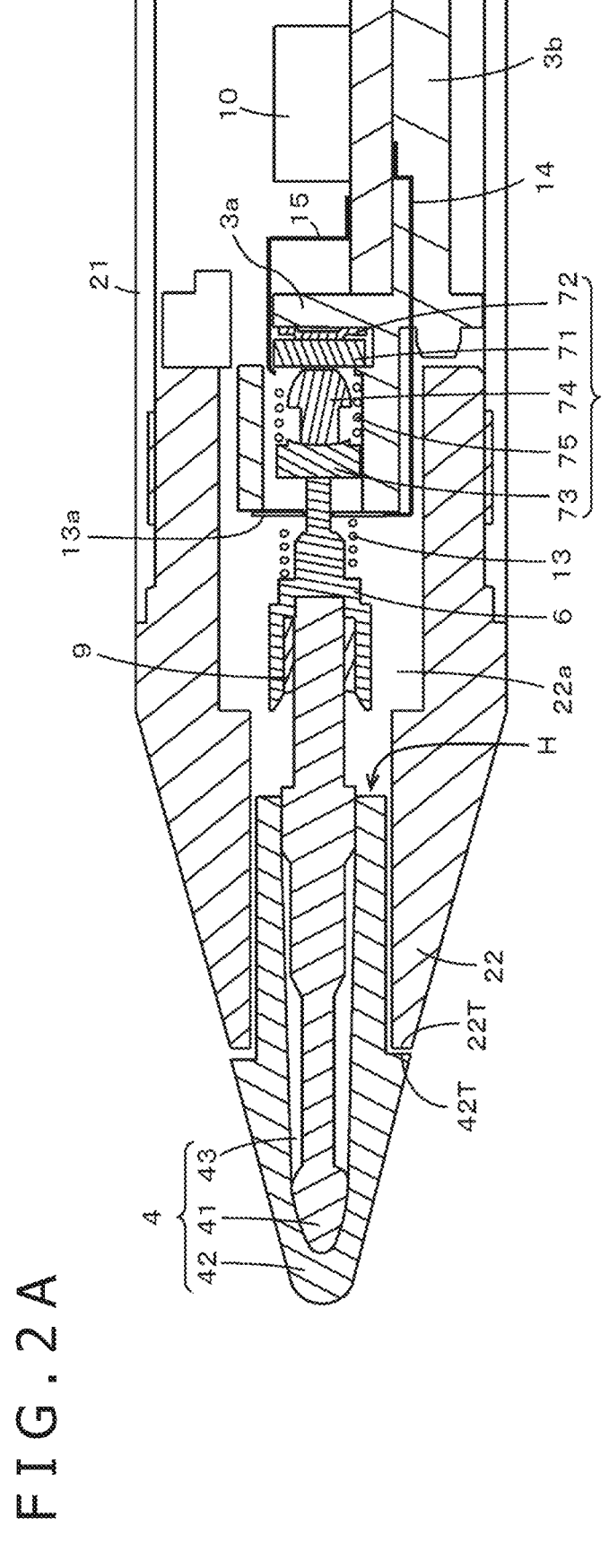
FIGS. 2A and 2B are diagrams for describing main parts of the electronic pen of the embodiment of the present disclosure.
Figure 2B:
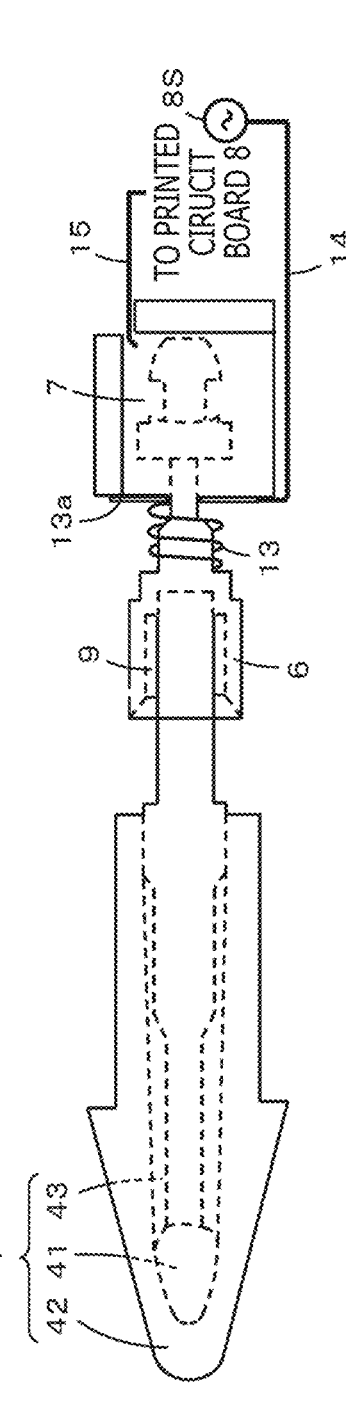

FIG. 1 is a diagram for describing a configuration example of an electronic pen 1 of the embodiment, and for the description, part of a case (housing) 2 of the electronic pen 1 is cut to illustrate the inside of the electronic pen 1. In addition, FIGS. 2A and 2B are diagrams for describing main parts of the electronic pen 1. Specifically, FIG. 2A is an enlarged cross-sectional view of main parts on the pen tip side of the electronic pen 1 which are not illustrated in FIG. 1. In addition, FIG. 2B is a diagram in which parts for realizing functions of pen pressure detection and signal transmission in the electronic pen 1 are extracted and schematically illustrated.

As illustrated in FIG. 1, the electronic pen 1 includes the case (housing) 2 in a cylindrical shape elongated in an axial direction (a direction along the axial center). One side of the case 2 in the axial direction is the pen tip side with an opening, and the other side in the axial direction is closed. The case 2 contains a conductive material, which is anodized aluminum in the example, and includes a case body 21 in a cylindrical shape including a hollow portion inside and a front cap 22 and a rear cap 23 coupled to the case body 21. The front cap 22 and the rear cap 23 are fitted to the case body 21 to form the case 2.

The front cap 22 is a cylindrical body including a through hole 22a in the axial direction as illustrated in FIG. 2A, and the external shape of the part on the pen tip side of the electronic pen 1 is a tapered shape with the outer diameter becoming gradually smaller toward the pen tip. An end portion on the pen tip side of the front cap 22 is an opening portion H of the through hole 22a. A board holder 3 for holding installed components, such as a printed circuit board 8, and a battery 5 are housed in the hollow portion of the case 2 as illustrated in FIG. 1, and a core body holder (core body holding portion) 6 and pressure sensing components (pen pressure detection portions) 7 are also housed in the hollow portion of the case 2 as illustrated in FIG. 2A.

As illustrated in FIGS. 1 and 2A, a core body 4 is inserted into the through hole 22a through the opening portion H of the front cap 22 and attached to the core body holder 6 inside the case 2. In addition, the core body 4 can also be removed from the core body holder 6. That is, the core body 4 can be attached to and detached from the case 2. Although described in detail later, the core body 4 includes a core rod 41 formed from a conductive material and a protection member 42 formed from a non-conductive material, and the core body 4 is provided with a space (air layer) 43 between the core rod 41 and the protection member 42.

The board holder 3 is formed from an insulating resin, such as a liquid crystal polymer, and when the board holder 3 is housed in the hollow portion of the case 2, a pressure sensing component holding portion 3a and a printed circuit board mounting table portion 3b are continuous in the axial direction of the electronic pen 1 as illustrated in FIG. 2A. The pressure sensing component holding portion 3a has a cylindrical shape including a hollow portion that houses the pressure sensing components 7 (a plurality of components for pen pressure detection), and the outer diameter of the pressure sensing component holding portion 3a is smaller than the inner diameter of the through hole 22a of the front cap 22. The printed circuit board mounting table portion 3b has a shape of a boat for mounting and holding the printed circuit board 8, and specifically, the printed circuit board mounting table portion 3b has a shape such that a cylindrical body is cut in substantially half in the axial direction.

The pressure sensing component holding portion 3a of the board holder 3 is set on the core rod 41 side, and the entire pressure sensing component holding portion 3a and printed circuit board mounting table portion 3b are housed in the case 2 to fix the board holder 3 and prevent the board holder 3 from moving. In addition, as illustrated in FIG. 2A, the core body holder 6 that holds the core body 4 is coupled to the pressure sensing component holding portion 3a of the board holder 3, and the pressure (pen pressure) mainly applied to the core rod 41 of the core body 4 is transmitted to the pressure sensing components 7 in the pressure sensing component holding portion 3a.

As illustrated in FIG. 1, a terminal conductor 51 is provided on an end portion of the printed circuit board mounting table portion 3b of the board holder 3, on the opposite side of the pressure sensing component holding portion 3a. The terminal conductor 51 is brought into electrical contact with a positive-side terminal 5a of the battery 5 and electrically connected to a copper foil pattern of a power line of the printed circuit board 8. A coil spring terminal 52 that contains a conductive metal and that is electrically connected to a negative-side terminal 5b of the battery 5 is provided on a portion of the rear cap 23 fitted to the case body 21. The battery 5 is inserted into the case 2 in such a manner as to connect the positive-side terminal 5a to the terminal conductor 51 as illustrated in FIG. 1. Subsequently, the rear cap 23 is fitted to the case body 21 such that the coil spring terminal 52 presses the negative-side terminal 5b of the battery 5.

In the embodiment, the case body 21 containing a conductive material is electrically connected to an earth conductor of the printed circuit board 8. The rear cap 23 and the case body 21 contain a conductive material, and therefore, the negative-side terminal 5b of the battery 5 is electrically connected to the earth conductor of the printed circuit board 8 through the rear cap 23 and the case body 21. Meanwhile, the positive-side terminal 5a of the battery 5 is connected to the copper foil pattern of the power line of the printed circuit board 8 through the terminal conductor 51. As a result, the voltage of the battery 5 is supplied as a power supply voltage of a circuit formed on the printed circuit board 8.

A circuit unit including a signal generation circuit 8S, an IC (Integrated Circuit) 10, and peripheral circuit components around the IC 10 are provided on the printed circuit board 8. The signal generation circuit 8S generates a signal to be transmitted from the core rod 41 of the electronic pen 1. The IC 10 is included in a control circuit that controls the transmission of the signal from the signal generation circuit 8S to the core rod 41. The peripheral circuit unit includes push switches (side switches) 11 and 12, and the push switches 11 and 12 are operated through operation portions 11a and 12a. In addition, a conductor terminal member 14 that connects the core rod 41 and the signal generation circuit 8S and a conductor terminal member 15 that transmits detection output of pen pressure from the pressure sensing components 7 are connected to the printed circuit board 8.

The core body 4 is fitted to the core body holder 6 containing a conductive material, through a conductive elastic member 9, and the core body 4 is coupled to and held by the core body holder 6, as illustrated in FIG. 2A. The core body holder 6 is fitted to a holding member 73 of the pressure sensing components 7 in the pressure sensing component holding portion 3a of the board holder 3, and the pressure (pen pressure) applied to the core body 4 is transmitted to the pressure sensing components 7.

In this case, a coil spring 13 as an example of an elastic member containing a conductive material, such as a conductive metal, provided between the core body holder 6 and the board holder 3 always biases the core body holder 6 toward the core rod 41 with respect to the board holder 3. Note that the coil spring 13, along with the conductor terminal member 14, is included in electrical connection members that transmit, to the core rod 41, the signal from the signal generation circuit 8S in which the transmission of the signal is controlled by the IC 10 arranged on the printed circuit board 8. Therefore, a metal plate 13a is provided on an end portion on the pen tip side of the pressure sensing component holding portion 3a of the board holder 3, and the coil spring 13 and the conductor terminal member 14 are electrically connected to each other.

That is, as illustrated in FIG. 2B, the signal from the signal generation circuit 8S goes through the conductor terminal member 14, the metal plate 13a, the coil spring 13, the core body holder 6, and the core rod 41, in this order, and the signal is sent out from the core rod 41. The conductor terminal member 14, the coil spring 13, the metal plate 13a, the core body holder 6, and the core rod 41 are included in the electrical connection members, and a transmission route of the position indication signal from the signal generation circuit 8S of the printed circuit board 8 is formed.

A variable capacitor in which the capacitance changes according to the pen pressure applied to the core rod 41 is used for the pressure sensing components (pen pressure detection portions) 7 of the embodiment. The pressure sensing components 7 include a plurality of components including a dielectric 71, a terminal member 72, the holding member 73, a conductive member 74, and an elastic member 75 as illustrated in FIG. 2A. The terminal member 72 contains a conductive material, and the terminal member 72 is included in a first electrode of the variable capacitor including the pressure sensing components 7. In addition, the conductive member 74 contains, for example, conductive rubber, and the elastic member 75 includes a coil spring containing a conductive material. The conductive member 74 and the elastic member 75 are electrically connected to each other, and the conductive member 74 and the elastic member 75 are included in a second electrode of the variable capacitor.

As a result, the capacitance of the variable capacitor formed between the terminal member 72 included in the first electrode and the conductive member 74 included in the second electrode changes according to the pressure applied to the core rod 41. The change in the capacitance of the variable capacitor is supplied from the pressure sensing components 7 to the IC 10 provided on the printed circuit board 8, through the conductor terminal member 15, and the IC 10 detects the pen pressure.

That is, as illustrated in FIG. 2A, the core body 4 of the electronic pen 1 of the embodiment is installed on the core body holder 6 inside the case 2, and the core body 4 can move in the axial direction. As a result, the core body 4 is pushed toward the inside of the case 2 according to the pen pressure applied by the user to the core rod 41. Accordingly, the core rod 41 and the core body holder 6 press the pressure sensing components 7, and the pen pressure can be detected. In addition, when the pen pressure applied to the core rod 41 is released, the action of the coil spring 13 described above can return the core body holder 6 and the core body 4 to the initial state illustrated in FIG. 2A.

The IC 10 of the electronic pen 1 performs control of transmitting, to the position detection sensor, a burst signal (position indication signal) for coordinate detection (position detection) corresponding to the signal from the signal generation circuit 8S. As a result, the position detection sensor side can detect the position indicated by the electronic pen 1 on the position detection sensor. Further, in the circuit including the IC 10 provided on the printed circuit board 8 of the electronic pen 1, the pressure sensing components 7 execute an operation of detecting the pen pressure on the basis of the capacitance in a period in which the burst signal is transmitted. After the end of the transmission period of the burst signal, the IC 10 transmits, from the core rod 41, an encoded signal, which is obtained by modulating the signal from the signal generation circuit 8S according to the detected pen pressure, and notifies the position detection sensor side of the pen pressure. As a result, the position detection sensor side can also detect the pen pressure applied to the core body 4 of the electronic pen 1.

In this way, the electronic pen 1 of the embodiment realizes the function of indicating the position on the position detection sensor to the position detection sensor and detecting the pen pressure applied to the core rod 41, to notify the position detection sensor of the pen pressure. Further, the electronic pen 1 of the embodiment is characterized in the configuration of the core body 4. The electronic pen 1 can maintain favorable linear characteristics regarding the position detection to allow the position detection sensor side to appropriately detect the indicated position. In addition, the core body 4 used in the electronic pen 1 of the embodiment has sufficient strength as a core body. The configuration of the core body 4 is simple, and the core body 4 can easily be manufactured.

Configuration Example of Core Body 4

FIGS. 3A and 3B are diagrams for describing a configuration example of the core body 4 of the electronic pen 1. In FIGS. 3A and 3B, FIG. 3A is an external view of the protection member 42 of the core body 4, and FIG. 3B is an external view of the core rod 41 of the core body 4. The core body 4 of the embodiment includes two members including the core rod 41 (FIG. 3B) and the protection member 42 (FIG. 3A) as illustrated in FIG. 2A and as also illustrated in FIGS. 3A and 3B.

The core rod 41 is a rod-shaped body with conductivity, and the core rod 41 has a columnar shape with parts of different thicknesses, except for a front end part. The core rod 41 is formed by, for example, a metal material. In the embodiment, stainless steel (SUS (Steel Special Use Stainless)) or brass is used to form the core rod 41. The core rod 41 includes three parts including a pen tip portion 41a, an axis portion 41b, and an installation portion 41c as illustrated in FIG. 3B. The pen tip portion 41a is a part formed in an oval shape (prolate sphere) on the front end part of the core rod 41, and the shape allows to efficiently emit the position indication signal toward the position detection sensor.

The axis portion 41b is a part that connects the pen tip portion 41a and the installation portion 41c, and as illustrated in FIG. 3B, the axis portion 41b includes three parts including a front-side axis portion 41b1, a middle axis portion 41b2, and a rear-side axis portion 41b3. The rear-side axis portion 41b3 is included in a portion fitted to the protection member 42 described in detail later. Therefore, the rear-side axis portion 41b3 will be referred to as a fitting portion 41b3 below. It is assumed in the embodiment that the diameter of the part of the pen tip portion 41a with the largest width (hereinafter, referred to as a wide part) is L1 and that the diameter of the fitting portion 41b3 of the axis portion 41b is L2 as illustrated in FIG. 3B. The diameter L1 of the wide part of the pen tip portion 41a is shorter than the diameter L2 of the fitting portion 41b3 (L1<L2).

Note that, in the embodiment, roulette processing is applied to a side surface of the fitting portion 41b3, at the part indicated by a symbol RT in FIG. 3B. The roulette processing is processing of fine ridges applied to metal, and the roulette processing is also called knurling. Knurling has an effect of a better grip, and this can prevent the core rod 41 from easily coming off from the protection member 42 when the core rod 41 is installed on the protection member 42, as described later.

In addition, the diameter of the front-side axis portion 41b1 gradually increases from the pen tip side toward the rear end side. Similarly, the diameter of the middle axis portion 41b2 gradually increases from the pen tip side toward the rear end side. In addition, a connection part of the front-side axis portion 41b1 and the middle axis portion 41b2 has a big change in diameter. The diameter of any part of the front-side axis portion 41b1 is shorter than the diameter L1 of the pen tip portion 41a. In addition, the diameter of any part of the middle axis portion 41b2 is shorter than the diameter L2 of the fitting portion 41b3. Therefore, the diameter of the axis portion 41b gradually increases from the front end side toward the rear end side in the structure such that Lb1<Lb2<L2 holds, where Lb1 represents the diameter of the front-side axis portion 41b1 and Lb2 represents the diameter of the middle axis portion 41b2.

The installation portion 41c is a part installed, through the conductive elastic member 9, on the core body holder 6 provided inside the electronic pen 1, as described with reference to FIGS. 2A and 2B. That is, the installation portion 41c of the core rod 41 can be pushed into a cup part of the core body holder 6 provided with the conductive elastic member 9, to thereby install the core body 4 on the electronic pen 1, and the installation portion 41c can be pulled out to remove the core body 4 from the electronic pen 1. That is, the core body 4 including the core rod 41 and the protection member 42 described later can be attached to and detached from the electronic pen 1 through the installation portion 41c of the core body 4.

The protection member 42 that is another constituent member of the core body 4 covers side surfaces of the pen tip portion 41a and the axis portion 41b of the core rod 41 as illustrated in FIGS. 2A and 2B. The protection member 42 protects the core rod 41 and realizes a favorable feel of writing. In the embodiment, the protection member 42 is formed from various types of resin materials, and the protection member 42 can be formed with use of, for example, polyamide, polycarbonate, modified polyphenylene ether, polybutylene terephthalate, polyacetal, and the like. In the embodiment, polyacetal is used to form the protection member 42. The polyacetal is also called POM (polyoxymethylene).

The protection member 42 includes a front end portion 42a in a tapered shape becoming gradually narrower toward the front end and an extension portion 42b extending from a rear end surface of the front end portion 42a to the rear end side. An insertion hole 42c, in which a rear end surface of the extension portion 42b is an opening and into which the core rod 41 is inserted and installed, is provided inside the protection member 42 in a longitudinal direction. The center of the insertion hole 42*c* in the longitudinal direction coincides with the center (axial center) of the protection member 42 in the longitudinal direction. In addition, a length (full length) LY of the insertion hole 42*c* of the protection member 42 in the longitudinal direction coincides with a length LY from the front end of the pen tip portion 41*a* of the core rod 41 to a position slightly closer to the front side with respect to a rear end surface of the fitting portion 41*b*3 of the core rod 41 as illustrated in FIGS. 3A and 3B.

In addition, the inner diameter at the position of the insertion hole 42*c* corresponding to the wide part of the pen tip portion 41*a* of the core rod 41 is the same as L1 or slightly shorter than L1, and the inner diameter at the position of the insertion hole 42*c* corresponding to the fitting portion 41*b*3 of the core rod 41 is the same as L2 or slightly shorter than L2. The insertion hole 42*c* is a hole portion without ridges on an inner wall surface thereof, and the shape of the insertion hole 42*c* becomes gradually narrower from the opening on the rear end side toward the front end. The core rod 41 can easily be inserted into the insertion hole 42*c*.

As a result, when the core rod 41 is inserted into the insertion hole 42*c* of the protection member 42 from the pen tip portion 41*a*, the part from the wide part to the front end side of the pen tip portion 41*a* of the core rod 41 comes in close contact with the inner wall surface on the front end side of the insertion hole 42*c* as illustrated in FIGS. 2A and 2B. In addition, the side surface of the fitting portion 41*b*3 of the core rod 41 comes in close contact with the inner wall surface around an opening portion of the insertion hole 42*c* as illustrated in FIGS. 2A and 2B. As a result, the protection member 42 is firmly attached to the core rod 41. In this way, when the core rod 41 is inserted and attached to the insertion hole 42*c* of the protection member 42, the space (air layer) 43 is formed between the axis portion 41*b* of the core rod 41 and the inner wall surface of the insertion hole 42*c* as illustrated in FIGS. 2A and 2B.

That is, the insertion hole 42*c* of the protection member 42 becomes gradually narrower from the part with the diameter L2 on the rear end side toward the part with the diameter L1 on the front end side as described above and as also illustrated in FIG. 3A. In addition, as described above with reference to FIG. 3B, the diameter of the fitting portion 41*b*3 is L2, and the diameter of the wide part of the pen tip portion 41*a* is L1 in the core rod 41. Therefore, the core rod 41 has a shape becoming gradually narrower from the fitting portion 41*b*3 toward the pen tip portion 41*a*. Further, the diameter of any part of the front-side axis portion 41*b*1 is shorter than the diameter L1 of the wide part of the pen tip portion 41*a*, and the diameter of any part of the middle axis portion 41*b*2 is shorter than the diameter L2 of the fitting portion 41*b*3.

In this regard, it is assumed that the core rod 41 is inserted and pushed into the insertion hole 42*c* of the protection member 42 and installed on a fixed position. In this case, the space (air layer) 43 as a middle portion is generated between side surfaces of the front-side axis portion 41*b*1 and the middle axis portion 41*b*2 of the core rod 41 and the inner wall surface of the insertion hole 42*c* of the protection member 42 as illustrated in FIGS. 2A and 2B. That is, there is provided a structure in which the space (air layer) 43 is provided around the front-side axis portion 41*b*1 and the middle axis portion 41*b*2 and in which the protection member 42 is provided outside the space 43. It can be considered that the space (air layer) 43 as well as the protection member 42 formed from polyacetal are dielectrics that are substances in which the dielectric properties are dominant over the conductivity, and the dielectric constants of the space 43 and the protection member 42 are different.

That is, in the case of the core body 4 of the embodiment, the space (air layer) 43 is present around the front-side axis portion 41*b*1 and the middle axis portion 41*b*2 of the core rod 41, and the protection member 42 is present outside the space 43, as illustrated in FIG. 2A. Therefore, the front-side axis portion 41*b*1 and the middle axis portion 41*b*2 of the core rod 41 are surrounded by two layers including the space (air layer) 43 and the protection member 42 in the structure. In other words, it can be stated that two capacitors including a capacitor including the space (air layer) 43 as a dielectric and a capacitor including the polyacetal (protection member 42) as a dielectric are provided around the front-side axis portion 41*b*1 and the middle axis portion 41*b*2 of the core rod 41 in the structure. In this case, the air layer and the polyacetal have different dielectric constants, and therefore, two capacitors including dielectrics with different dielectric constants are provided.

On the other hand, as illustrated in FIGS. 2A and 2B, an inner wall surface of the protection member 42 and a side surface of the pen tip portion of the core rod 41 are in close contact with each other at the part on the front end side from the wide part of the pen tip portion 41*a* of the core rod 41. Therefore, there is no space, and only the front end portion 42*a* of the protection member 42 is present. In other words, it can be stated that one capacitor including the polyacetal (protection member 42) as a dielectric is provided at the part on the front end side from the wide part of the pen tip portion 41*a* of the core rod 41.

As a result, the signal (electric field) emitted from the part on the front end side with respect to the wide part of the pen tip portion 41*a* of the core rod 41 is relatively efficiently emitted through only the protection member 42. Therefore, the signal (electric field) emitted through the part on the front end side with respect to the wide part of the pen tip portion 41*a* of the core rod 41 is large. However, the signal (electric field) emitted from the front-side axis portion 41*b*1 and the middle axis portion 41*b*2 of the core rod 41 is suppressed by two layers of capacitors including the space 43 and the protection member 42. Therefore, the signal (electric field) emitted through the front-side axis portion 41*b*1 and the middle axis portion 41*b*2 of the core rod 41 is small. Further, the diameter of the front-side axis portion 41*b*1 of the core rod 41 is shorter than the diameter of the wide part of the pen tip portion 41*a*, and the emitted signal (electric field) can be smaller than the signal (electric field) emitted from the pen tip portion 41*a*.

That is, the signal (electric field) emitted through the part on the front end side with respect to the wide part of the pen tip portion 41*a* of the core rod 41 can be large, and the signal (electric field) emitted from the front-side axis portion 41*b*1 and the middle axis portion 41*b*2 of the core rod 41 can be small. In this way, the signal (electric field) leaked from the front-side axis portion 41*b*1 and the middle axis portion 41*b*2 of the core rod 41 can be suppressed. This can improve the linear characteristics as detection characteristics of the indicated position when the electronic pen 1 is tilted, and this can prevent the deviation of the position indicated by the electronic pen 1 on the position detection apparatus side.

In addition, the core body is conventionally formed by injection molding, in which the core rod 41 is inserted into the mold and fixed on the fixed position and the polyacetal is injected into the mold to form the core body. However, the core body 4 of the embodiment can be formed by a press-fitting system, in which the core rod 41 and the protection member 42 are separately formed and the core rod 41 is inserted into the insertion hole 42*c* of the protection member 42. Therefore, the core body 4 itself can easily be manufactured. The core rod 41 and the protection member 42 can be formed by methods suitable for the core rod 41 and the protection member 42, respectively.

In addition, the protection member 42 covers the pen tip portion 41*a* and the axis portion 41*b* of the core rod 41 in the core body 4 of the embodiment as described with reference to FIGS. 2A to 3B. Therefore, since the thickness of the axis portion 41*b* part and the extension portion 42*b* of the protection member 42 can be thickened, the diameter of the part of the core body 4 protruding from the opening portion H of the front cap 22 can be thickened. As a result, the strength of the extension portion 42*b* of the core body 4 and the axis portion 41*b* part of the core rod 41 can be strengthened as illustrated in FIGS. 1 and 2A. In addition, the interval between a side surface of the extension portion 42*b* of the protection member 42 and an inner wall surface of the front cap 22 is very small as illustrated in FIG. 2A. This can prevent most of the looseness of the core body 4 during writing, and this can protect the core body 4 even when force in a direction crossing the axial direction is applied to the front end portion 42*a* of the core body 4.

In addition, the core body 4 can slide in the axial direction to allow appropriate detection of the pen pressure. However, a rear end surface 42T of the front end portion 42*a* of the protection member 42 and a front end surface 22T of the front cap 22 face each other at a little interval. Therefore, even if large force is applied to the front end portion 42*a* in the axial direction of the electronic pen 1 due to sudden application of large pen pressure or due to a drop of the electronic pen 1 from a desk to a floor, the rear end surface 42T of the front end portion 42*a* and the front end surface 22T of the front cap 22 come into contact with each other. As a result, the core body 4 is not pushed into the case 2 of the electronic pen 1 more than necessary, and this can prevent the inconvenience of damaging the pressure sensing components 7.

Effects of Embodiment

The core body 4 of the embodiment described above is provided with the space (air layer) 43 as a middle portion around the axis portion 41*b* of the core rod 41 and is provided with the extension portion 42*b* of the protection member 42 around the space 43. The space 43 and the protection member 42 have different dielectric constants, and therefore, two layers of capacitors are provided around the axis portion 41*b* of the core rod 41. This can suppress the signal (electric field) emitted from the axis portion 41*b* of the core rod 41. As a result, an excessive electric field from the axis is suppressed, and this can realize the core body for the electronic pen with favorable characteristics of the indicated position and the linearity when the electronic pen is tilted. In addition, the configuration of the core body 4 is simple, and this can realize the core body for the electronic pen that can easily be manufactured. Therefore, the core body 4 of the embodiment can be used to realize the electronic pen with favorable detection characteristics of the indicated position and the tilt.

Modifications

Other Examples of Core Rod 41

FIGS. 4A to 4C are diagrams for describing other configuration examples of the core rod 41 of the core body 4. As illustrated in a core rod 41A of FIG. 4A, an axis portion 41*b*A that connects a pen tip portion 41*a*A and an installation portion 41*c*A may include a front-side axis portion b1A and a fitting portion b3A. That is, the axis portion 41*b*A is not separated into the front-side axis portion 41*b*1 and the middle axis portion 41*b*2, unlike in the axis portion 41*b* illustrated in FIGS. 2A to 3B, and the axis portion 41*b*A is a straight component with one stage. In this way, the axis portion of the core rod may be one-stage component except for the installation portion 41*c*A as illustrated in FIG. 4A, may be a two-stage component except for the installation portion 41*c* as illustrated in FIGS. 2A to 3B, or may be a component with more than two stages.

In addition, as illustrated in a core rod 41B of FIG. 4B, the core rod 41B includes a pen tip portion 41*a*B, an axis portion 41*b*B, and an installation portion 41*c*B, and the axis portion 41*b*B includes a front-side axis portion b1B and a fitting portion b3B. Although the configuration of the axis portion 41*b*B and the installation portion 41*c*B is substantially similar to the configuration in the core rod 41A of FIG. 4A, the shape of the pen tip portion 41*a*A is a spherical shape. That is, the shape of the pen tip portion 41*a* of the core rod 41 is not limited to the oval shape, and the shape can be various types of shapes, such as a spherical shape, a cannonball shape with a dome-shaped front end, and an arrowhead shape with a sharpened front end, in consideration of the state of the emission of the signal (electric field).

In addition, as illustrated in FIG. 4C, a pen tip portion 41*a*C, an axis portion 41*b*C, and an installation portion 41*c*C may be formed from a metal material in an integrated manner, and a fitting portion 44 may be formed as a separate component. In this case, although the fitting portion 44 can also be formed from a metal material, a different material, such as hard rubber, may be used to form the fitting portion 44 into a cylindrical shape with some thickness. This is because the pen tip portion 41*a*C, the axis portion 41*b*C, and the installation portion 41*c*C of the core rod 41C are formed from the metal material in an integrated manner and are conductive, so that the conductivity of the core rod 41C is not lost even when the fitting portion 44 is formed from a non-conductive material.

The core rods 41A, 41B, and 41C described with reference to FIGS. 4A to 4C are examples, and there can be various other modifications. In short, the core rod can have various types of shapes as long as the core rod is conductive from the front end to the rear end, and a middle portion, such as the space (air layer) 43, can be provided between the axial center part and the protection member 42 when the core rod is inserted into the insertion hole 42*c* of the protection member 42 and installed on the fixed position.

Other Examples of Protection Member 42

Figure 5A:
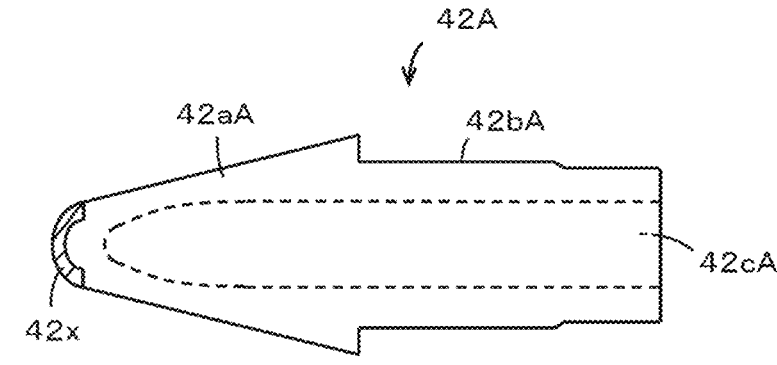
FIGS. 5A to 5C are diagrams for describing other configuration examples of a protection member of the core body of the electronic pen of the embodiment of the present disclosure.
Figure 5B:
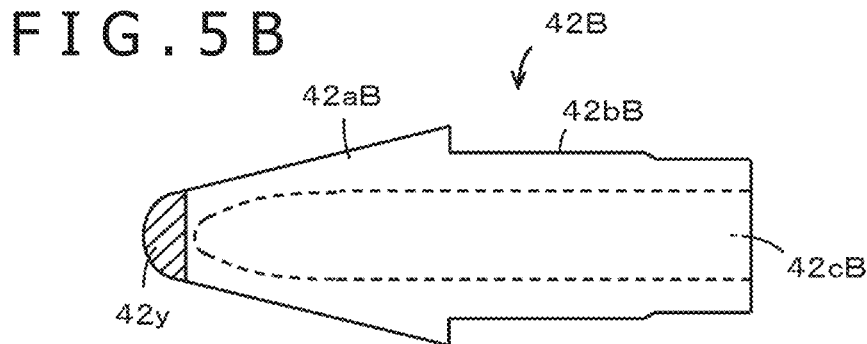
Figure 5C:
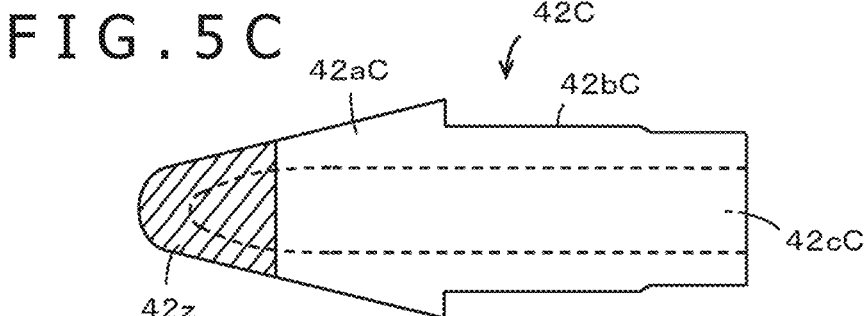

FIGS. 5A to 5C are diagrams for describing other configuration examples of the protection member 42 of the core body 4. As described with reference to FIGS. 3A and 3B, the resin material is used to form the protection member 42, and the protection member 42 is formed from polyacetal in the embodiment. However, the material is not limited to this. The protection member may also be formed with use of a technique called two-color molding (double molding) in which two types of resin materials are used to create one molded product.

A protection member 42A (FIG. 5A), a protection member 42B (FIG. 5B), and a protection member 42C (FIG. 5C) illustrated in FIGS. 5A to 5C are formed to have shapes similar to the shape of the protection member 42 of the core body 4 illustrated in FIGS. 1 to 3B. That is, the protection members 42A, 42B, and 42C illustrated in FIGS. 5A to 5C include front end portions 42aA, 42aB, and 42aC, extension portions 42bA, 42bB, and 42bC, and insertion holes 42cA, 42cB, and 42cC, respectively, as in the protection member 42. However, two types of resin including polyacetal and elastomer are used, and the two-color molding technique is used to form the protection members 42A, 42B, and 42C.

Most of the front end portion 42aA and the extension portion 42bA are formed from polyacetal in the protection member 42A illustrated in FIG. 5A, and a dome-shaped contact portion 42x formed from elastomer is provided on a frontmost part of the front end portion 42aA (a part in contact with an operation surface). The elastomer refers to a soft polymeric material that is elastic as rubber, and the softness, the elasticity, and other physical properties can be adjusted by the composition of the materials. In this way, a desirable feel of writing can be realized by providing the contact portion 42x containing elastomer on the front end portion 42aA.

Note that the feel of writing refers to conditions or writability in writing when the electronic pen is brought into contact with the operation surface to write, that is, a sense of touch transmitted to the hand of the user through the electronic pen. Therefore, by providing the contact portion 42x formed from elastomer, the electronic pen more softly comes in contact with the operation surface during writing, and the user can feel the sense of writing.

In the case of the protection member 42A illustrated in FIG. 5A, two layers of capacitors are formed by the front end side of the front end portion 42aA containing polyacetal and the contact portion 42x containing elastomer. The thickness of the contact portion 42x is thin, and there is a slight possibility that the signal (electric field) emitted from the contact portion 42x side is suppressed. Therefore, the thickness of a contact portion 42y of the front end portion 42aB is thickened as in the protection member 42B illustrated in FIG. 5B. As a result, only the contact portion 42y formed from elastomer is on the pen tip side. This can prevent the suppression of the signal (electric field) emitted from the contact portion 42y side, and this can realize a desirable feel of writing.

Further, as illustrated in the protection member 42C of FIG. 5C, a part of the front end portion 42aC of the protection member 42C positioned on the front end side with respect to at least the wide part of the pen tip portion 41a of the core rod 41 is formed into a contact portion 422 containing elastomer. This can efficiently emit the signal (electric field) emitted from the pen tip portion 41a of the core rod 41 without significantly suppressing the signal, and this can realize a desirable feel of writing.

The protection members 42A, 42B, and 42C described with reference to FIGS. 5A to 5C are examples, and there can be various other modifications. In short, it is sufficient if the protection member is configured to emit the signal (electric field) from the pen tip portion of the core rod without attenuating the signal and is configured to emit the signal (electric field) from the axis portion of the core rod after attenuating the signal through the middle portion, such as the space (air layer), and the protection member.

In addition, the contact portions 42x, 42y, and 42z attached to the front end by two-color molding may be conductive. A strong electric field can be emitted from the core body when the contact portions 42x, 42y, and 42z are conductive.

Another Configuration Example of Electronic Pen 1

FIG. 6 is a diagram for describing another configuration example of the electronic pen 1. In FIG. 6, the same reference symbols are provided to the parts with configurations similar to the configurations in the electronic pen 1 illustrated in FIGS. 2A and 2B, and the detailed description of these parts will not be repeated. In the case of the electronic pen 1 of the embodiment described above, the entire front end portion 42a of the protection member 42 of the core body 4 protrudes from the opening portion H of the front cap 22 of the case 2 as illustrated in FIGS. 1, 2A, and 2B. However, the configuration is not limited to this.

A core body 4X of an electronic pen 1A illustrated in FIG. 6 includes, for example, the core rod 41A illustrated in FIG. 4A and a protection member 42X, and a space (air layer) 43A is provided around an axis portion 41b1A of the core rod 41A. Here, as illustrated in FIG. 6, the protection member 42X is provided with a side surface part 42Xa1 in which the rear end side of a front end portion 42Xa is parallel to the axial center. Obviously, the inside of the core body 4X can be similar to the inside of the core body 4 of the embodiment described above.

In addition, an opening portion HA of a front cap 22A in the case of the electronic pen 1A illustrated in FIG. 6 is wider than the opening portion H of the front cap 22 of the electronic pen 1 illustrated in FIGS. 2A and 2B. Although the shape of the opening portion HA of the front cap 22A on the front end side is similar to the shape of a rear end surface 42XT of the protection member 42X, the diameter of the opening portion HA on the front end side is slightly longer than the rear end surface 42XT of the front end portion 42Xa of the protection member 42. As a result, the side surface part 42Xa1 of the core body 4X on the rear end side of the front end portion 42Xa of the protection member 42X is fitted into the opening portion HA of the front cap 22A.

However, the front cap 22A in the case of the electronic pen 1A illustrated in FIG. 6 is provided with a ring-shaped projection portion 22P projecting inside, at a position slightly lowered to the rear end side from the front end of the front cap 22A. A front end surface 22Px of the projection portion 22P faces the rear end surface 42XT of the front end portion 42Xa of the core body 4X. In a state in which the electronic pen 1A illustrated in FIG. 6 is not used, there is a little gap between the front end surface 22Px of the projection portion 22P and the rear end surface 42XT of the core body 4X. Therefore, also in the case of the electronic pen 1A, the core body 4X is pushed toward the rear end side when the pen pressure is applied to the core body 4X, and the core body 4X is pushed out to the original position when the pen pressure is released.

Therefore, in the case of the electronic pen 1A illustrated in FIG. 6, the rear end surface 42XT of the front end portion 42Xa and the front end surface 22Px of the front cap 22A come into contact with each other even when large force in the axial direction is applied to the front end portion of the core body 4X due to sudden application of large pen pressure or a fall of the electronic pen 1A. As a result, the core body 4X is not pushed into the case (housing) of the electronic pen 1A more than necessary, and this can prevent the inconvenience of damaging the pressure sensing components 7.

In addition, in the case of the electronic pen 1A illustrated in FIG. 6, the side surface part 42Xa1 on the rear end side of the front end portion 42Xa of the protection member 42X faces an inner wall surface on the front end side of the opening portion HA of the front cap 22A. This can prevent most of the looseness of the core body 4X during writing, and this can protect the core body 4 even if force is applied to the front end portion 42Xa of the core body 4X in a direction crossing the axial direction. Further, the interval between a side surface of an extension portion 42Xb of the core body 4X and an inner wall surface of the projection portion 22P of the front cap 22A can be reduced as much as possible to provide stronger strength to the core body 4X against the force in the direction crossing the axial direction. In this case, the projection portion 22P of the front cap 22A may be extended in the axial direction to broaden the area facing the side surface of the extension portion 42Xb of the core body 4X.

Another Configuration Example of Core Body 4

FIG. 7 is a diagram for describing another configuration example (core body 4Y) of the core body 4 of the electronic pen 1. The core body 4 described with reference to FIGS. 3A and 3B include two members including the protection member 42 and the core rod 41. On the other hand, the core body 4Y of the example includes three members including a front end member 45, an extension member 46, and the core rod 41. FIG. 7 is an external view of the front end member 45, with an external view of the extension member 46, and an external view of the core rod 41.

As can be understood by comparing FIGS. 3B and 7C, the core rod 41 of the core body 4Y of the example is similar to the core rod 41 of the core body 4 described above. Therefore, the core rod 41 is provided with the same reference symbol as the reference symbol for the core rod 41 illustrated in FIG. 3C, and the description of the core rod 41 will not be repeated. Note that the core rod 41 is formed from a metal material, and stainless steel (SUS (Steel Special Use Stainless)) or brass is also used to form the core rod 41 in the example.

In the core body 4Y of the example, the front end member 45 and the extension member 46 are included in a part corresponding to the protection member 42 of the core body 4 described above with reference to FIGS. 3A and 3B. The front end member 45 has an appearance of a cone shape with a roundish front end part as illustrated in FIG. 7. The front end member 45 is what is generally called a dome-shaped member including a large circular bottom-surface opening portion 45H provided on a bottom surface and including a space inside. A space on the front end portion side in the space provided inside the front end member 45 is a pen tip fitting portion 451 to which the pen tip portion 41a of the core rod 41 is fitted. In addition, a space on the bottom surface side in the space provided inside the front end member 45 is an extension member fitting portion 452 to which a front side part of the extension member 46 described later (a front-side tapered portion 461, a side-surface groove portion 46G, and a part on the front side of a middle portion 462) is fitted.

On a part closer to the bottom-surface opening portion 45H on an inner wall surface of the extension member fitting portion 452, an inner protrusion 452P is provided in a ring shape along the inner edge of the bottom-surface opening portion 45H. In addition, a part outside the bottom-surface opening 45H of the front end member 45 is a front end member rear end surface 45T with a thickness in a direction crossing (in the case of the example, a direction orthogonal to) the axial center (center axis of the core body 4Y). The front end member rear end surface 45T is a part facing the front end surface 22T of the front cap 22 of the case 2 when the core body 4Y of the example is installed on the electronic pen 1, as in the case in which the core body 4 illustrated in FIGS. 2A and 2B is used. In this embodiment, the front end member 45 is formed from silicon rubber.

The extension member 46 has a cylindrical shape (pipe shape) including a through hole formed in the axial direction (the same direction as the axial center) as illustrated in FIG. 7. The extension member 46 includes a front-side opening portion 46FH on the front side (front end member 45 side) and a rear-side opening portion 46BH on the rear side. The extension member 46 includes three parts including, from the front side, the front-side tapered portion 461 in a tapered shape (shape becoming gradually narrower), the middle portion 462, and a rear-side portion 463 with the diameter slightly shorter than the diameter of the middle portion 462. The side-surface groove portion 46G is provided on a side surface (outer wall surface) of the extension member 46, at a boundary part of the front-side tapered portion 461 and the middle portion 462.

The extension member 46 can be formed from a material similar to the material of the protection member 42 of the core body 4. Specifically, the extension member 46 can be formed from various types of resin materials, such as polyamide, polycarbonate, modified polyphenylene ether, polybutylene terephthalate, and polyacetal. In the embodiment, polyacetal is used to form the extension member 46. The polyacetal is also called POM (polyoxymethylene) as also described above.

As can be understood by viewing FIG. 7, the shape of the extension member fitting portion 452 that is the space inside the front end member 45 and the shape of the front side part of the extension member 46 (part including the front-side tapered portion 461, the side-surface groove portion 46G, and part on the front side of the middle portion 462) coincide with each other. Therefore, the front-side tapered part of the extension member 46 can be inserted and pushed into the bottom-surface opening portion 45H of the front end member 45 to join the front end member 45 and the extension member 46. In this case, an inner front end surface 452T of the extension member fitting portion 452 and a front end surface 461T of the extension member 46 come into contact with each other, and the inner protrusion 452P of the extension member fitting portion 452 of the front end member 45 is fitted in the side-surface groove portion 46G of the extension member 46. As a result, the inner wall surface of the extension member fitting portion 452 of the front end member 45 and a side surface (outer wall surface) of the front side part of the extension member 46 come in close contact with each other and do not easily come off.

In this way, the outer shape and the inner shape of a joint member formed by joining the front end member 45 and the extension member 46 are similar to those of the protection member 42 illustrated in FIG. 3A. Note that, as also described above, the front end member 45 is formed from silicon rubber and is elastic (resilient) and that the extension member 46 is a hard member formed from POM. Therefore, some force can be applied to pull them apart to thereby separate the joined front end member 45 and extension member 46. In this way, the front end member 45 and the extension member 46 can be attached to and detached from each other.

As can be understood by viewing FIG. 7, the joint member provided by joining the front end member 45 and the extension member 46 is included in an insertion hole 47h into which the core rod 41 is inserted and installed in the longitudinal direction inside. The through hole 47h corresponds to the through hole 42c in the protection member 42 described with reference to FIG. 3A. The center in the longitudinal direction of the insertion hole 47h coincides with the center (axial center) in the longitudinal direction of the joint member including the front end member 45 and the extension member 46. The length (full length) in the longitudinal direction of the insertion hole 47h of the joint member coincides with the length LY from the front end of the pen tip portion 41a of the core rod 41 to the position slightly closer to the front side with respect to the rear end surface of the fitting portion 41*b*3 of the core rod 41 illustrated in FIG. 7.

In addition, the inner diameter of the insertion hole 47*h* of the joint member at the position corresponding to the wide part of the pen tip portion 41*a* of the core rod 41 is the same as L1 or slightly shorter than L1, and the inner diameter of the insertion hole 47*h* at the position corresponding to the fitting portion 41*b*3 of the core rod 41 is the same as L2 or slightly shorter than L2. The insertion hole 47*h* does not include ridges on an inner wall surface thereof, and the insertion hole 47*h* is a hole portion in a shape becoming gradually narrower from the opening on the rear end side toward the front end. The core rod 41 can easily be inserted into the insertion hole 47*h*.

Figure 8:
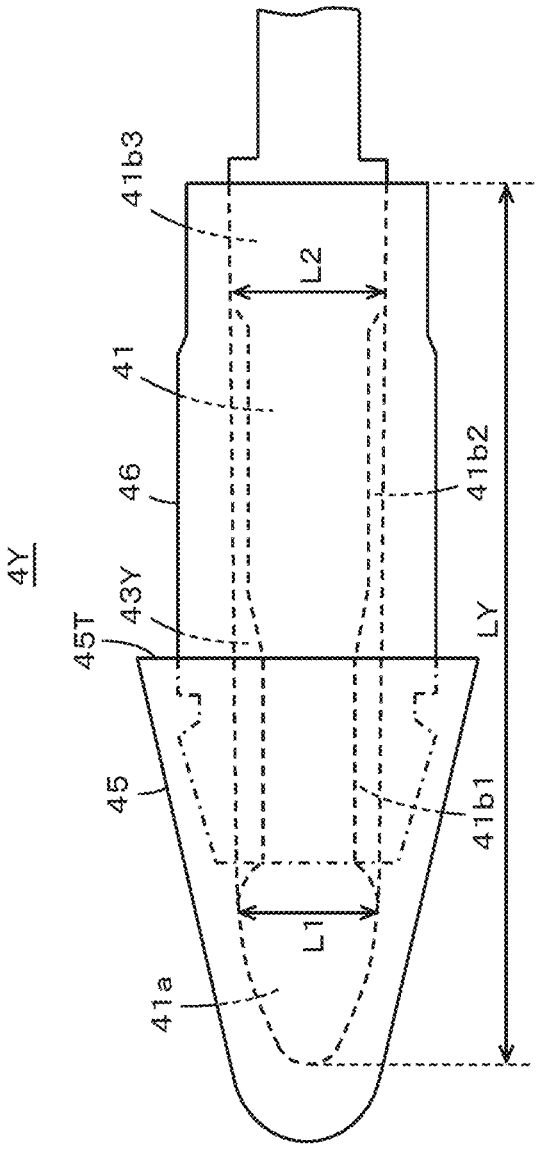
FIG. 8 is a diagram for describing another configuration example of the core body of the electronic pen of the embodiment.

When the core rod 41 is inserted and pushed, from the pen tip portion 41*a*, into the insertion hole 47*h* of the joint member including the front end member 45 and the extension member 46, a part from the wide part to the front end side of the pen tip portion 41*a* of the core rod 41 comes in close contact with the inner wall surface on the front end side of the insertion hole 47*h* as illustrated in FIG. 8. In addition, the side surface of the fitting portion 41*b*3 on the rear end side of the core rod 41 comes in close contact with the inner wall surface around an opening portion of the insertion hole 47*c* as illustrated in FIG. 8. As a result, the joint member including the joined front end member 45 and extension member 46 is attached to the core rod 41, and the core body 4Y is formed. Also in the case of the core body 4Y formed in this way, a space (air layer) 43Y is formed between the axis portion 41*b* of the core rod 41 and the inner wall surface of the insertion hole 47*h* of the joint member as illustrated in FIG. 8.

In this way, it can be considered, also in the case of the core body 4Y of the example that the space (air layer) 43Y and the joint member including the front end member 45 formed from silicon rubber and the extension member 46 formed from polyacetal are dielectrics that are substances in which the dielectric properties are dominant over the conductivity. In addition, the dielectric constant of the space 43Y and the dielectric constant of the joint member (mainly the extension member 46) are also different. Therefore, the signal (electric field) emitted from the front-side axis portion 41*b*1 and the middle axis portion 41*b*2 of the core rod 41 is suppressed by two layers of capacitors including the space 43 and the joint member including the front end member 45 and the extension member 46 also in the case of the core body 4Y of the example.

Therefore, the signal (electric field) emitted through the front-side axis portion 41*b*1 and the middle axis portion 41*b*2 of the core rod 41 is small also in the case of the core body 4Y of the example. Further, the diameter of the front-side axis portion 41*b*1 of the core rod 41 is shorter than the diameter of the wide part of the pen tip portion 41*a*, and the emitted signal (electric field) can be smaller than the signal (electric field) emitted from the pen tip portion 41*a*.

In this way, also in the case of the core body 4Y of the example, the signal (electric field) emitted through the part on the front end side with respect to the wide part of the pen tip portion 41*a* of the core rod 41 can be large, and the signal (electric field) emitted from the front-side axis portion 41*b*1 and the middle axis portion 41*b*2 of the core rod 41 can be small. In other words, the signal (electric field) leaked from the front-side axis portion 41*b*1 and the middle axis portion 41*b*2 of the core rod 41 can be suppressed. As a result, also in the case of using the core body 4Y of the example for the electronic pen 1, this can improve the linear characteristics as detection characteristics of the indicated position when the electronic pen 1 is tilted, and this can prevent the deviation of the position indicated by the electronic pen 1 on the position detection apparatus side.

In this way, effects similar to the effects in the case of the core body 4 can be obtained also in the case of the core body 4Y of the example. In addition, the core rod 41, the front end member 45, and the extension member 46 of the core body 4 of the example are separately formed. In this case, the front end member 45 and the extension member 46 are joined to form the joint member. The joint member corresponds to the protection member 42 of the core body 4 described with reference to FIGS. 3A and 3B. The core body 4Y can be formed by the press-fitting system, in which the core rod 41 is inserted into the insertion hole 47*h* of the joint member. Therefore, the core body 4Y itself can also easily be manufactured. The core rod 41, the front end member 45, and the extension member 46 can be formed by methods suitable for them, respectively.

Particularly, the front end member 45 is formed from an elastic member, such as silicon rubber, in the case of the core body 4Y of the example, and a softer feel of writing can be realized. In addition, by forming the front end member 45 from an elastic member, such as silicon rubber, the interval (gap) between the rear end surface 45T of the front end member 45 and the front end surface 22T of the front cap 22 of the case 2 of the electronic pen 1 can be narrowed. This is because, when the front end member 45 is formed from an elastic member, the core body 4Y can be pushed to some extent toward the rear end side even after the rear end surface 45T of the front end member 45 and the front end surface 22T of the front cap 22 come into contact with each other.

In addition, the electronic pen is used by bringing the pen tip into contact with the operation surface, and therefore, the pen tip wears out by friction. The replacement of only the front end member 45 is easy in the core body 4Y including the front end member 45, the extension member 46, and the core rod 41. Therefore, only the front end member 45 needs to be replaced in the case of the core body 4Y, and this is economical compared to when the entire core body is replaced. That is, this can realize the core body 4Y for the electronic pen that can more economically be used.

Middle Portion in Place of Space (Air Layer) 43

In the embodiment described above, the space (air layer) 43 as a middle portion is provided between the axis portion 41*b* of the core rod 41 (the front-side axis portion 41*b*1 and the middle axis portion 41*b*2) and the extension portion 42*b* of the protection member 42 as illustrated in FIGS. 2A and 2B. Similarly, the space (air layer) 43X as a middle portion is also provided between the axis portion 41*b*1A of the core rod 41A and the extension portion 42X*b* of the protection member 42X in the core body 4X of the electronic pen illustrated in FIG. 6. In addition, the space (air layer) 43Y as a middle portion is also formed between the axis portion 41*b* of the core rod 41 and the inner wall surface of the insertion hole 47*h* of the joint member including the front end member 45 and the extension member 46 in the case of the core body 4Y illustrated in FIGS. 7 and 8. However, the middle portion is not limited to the space (air layer).

For example, various types of methods, such as coating, vapor deposition, fusion, and winding, are used to apply a material with a dielectric constant different from the dielectric constant of the protection member 42 on the side surfaces of the front-side axis portion 41*b*1 and the middle axis portion 41*b*2 of the core rod 41, at a position similar to that of the space 43 and a thickness similar to that of the space 43. In this way, a middle portion containing a material different from the material of the protection member 42 can be provided on the side surfaces of the front-side axis portion 41*b*1 and the middle axis portion 41*b*2 of the core rod 41. The core rod 41 provided with the middle portion in this way is inserted into the insertion hole 42*c* of the protection member 42. As a result, the extension portion 42*b* of the protection member 42 can be positioned outside the middle portion, and the structure can be similar to the structure in which two layers of capacitors are formed around the front-side axis portion 41*b*1 and the middle axis portion 41*b*2.

Similarly, a middle portion containing a material with a dielectric constant different from the dielectric contact of the protection member 42X can be provided on the axis portion 41*b*A of the core rod 41A illustrated in FIG. 6, and the middle portion can be inserted into the insertion hole of the protection member 42X to form the core body 4X. In addition, also in the case of the core body 4Y illustrated in FIGS. 7 and 8, a material with a dielectric constant different from the dielectric constant of the front end member 45 or the extension member 46 may be supplied to provide a middle portion on the space (air layer) 43Y part.

In this way, the middle portion provided on the core bodies 4, 4X, and 4Y is not limited to the space (air layer) 43. A material with a dielectric constant different from the dielectric constant of the protection members 42 and 42X can be used to form a middle portion, and this can provide the core body for the electronic pen with favorable detection characteristics of the indicated position and the tilt.

Others

Although the fitting portion 41*b*3 is provided on the core rod 41 in the embodiment described above, the configuration is not limited to this. The fitting portion 41*b*3 may not be provided on the core rod 41, and the middle axis portion 41*b*2 may be extended to the fitting portion 41*b*3 part. In this case, a projection portion projecting inside is provided on a part corresponding to the protection member 42 or the extension member 46, that is, an opening portion part on the rear end side of the protection member 42 or the extension member 46, in place of the fitting portion 41*b*3 of the core rod 41. In this way, the projection portion of the protection member 42 or the extension member 46 and the rear end part of the middle axis portion 41*b*2 of the core rod 41 can be fitted to each other to fix the core rod 41 to the protection member 42 or the extension member 46. In this case, knurling may be applied to the rear end part of the middle axis portion 41*b*2 of the core rod 41 facing the projection portion of the protection member 42 or the extension member 46.

DESCRIPTION OF REFERENCE SYMBOLS

1, 1A: Electronic pen
2: Case
21: Case body
22, 22A: Front cap
22*a*: Through hole
H, HA: Opening portion
22T: Front end surface
22P: Projection portion
22Px: Front end surface
23 Rear cap
3: Board holder
3*a*: Pressure sensing component holding portion
3*b*: Printed circuit board mounting table portion
4, 4X, 4Y: Core body

41, 41A, 41B, 41C, 41X: Core rod
41*a*, 41*a*A, 41*a*B, 41*a*C: Pen tip portion
41*b*, 41*b*A, 41*b*B, 41*b*C, 41*b*1A: Axis portion
41*b*1, b1A, b1B: Front-side axis portion
41*b*2: Middle axis portion
41*b*3, b3A, b3B: Fitting portion (rear-side axis portion)
41*c*, 41*c*A, 41*c*B, 41*c*C: Installation portion
42, 42A, 42B, 42C, 42X: Protection member
42*a*, 42*a*A, 42*a*B, 42*a*C, 42Xa: Front end portion
42*b*, 42*b*A, 42*b*B, 42*b*C, 42Xb: Extension portion
42*c*, 42*c*A, 42*c*B, 42*c*C: Insertion hole
42*x*, 42*y*, 42*z*: Contact portion
42T, 42XT: Rear end surface
42Xa1: Side surface part
43, 43X, 43Y: Middle portion (space, air layer)
44: Fitting portion
45: Front end member
451: Pen tip fitting portion
452: Extension member fitting portion
452P: Inner protrusion
45T: Front end member rear end surface
45H: Bottom-surface opening portion
46: Extension member
46G: Side-surface groove portion
461: Front-side tapered portion
462: Middle portion
463: Rear-side portion
46FH: Front-side opening portion
46BH: Rear-side opening portion
5: Battery
5*a*: Positive-side terminal
5*b* Negative-side terminal
6: Core body holder
7: Pressure sensing component
71 Dielectric
72: Terminal member
73: Holding member
74: Conductive member
75: Elastic member
8: Printed circuit board
8S: Signal generation circuit
9: Conductive elastic member
10: IC
11, 12: Push switch
11*a*, 12*a*: Operation portion
13: Coil spring
13*a*: Metal plate
14: Conductor terminal member
15: Conductor terminal member
51: Terminal conductor
52: Coil spring terminal The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A core body for an electronic pen, the core body being attached inside a housing of the electronic pen including an opening portion on one end portion in an axial direction of the electronic pen, the core body being attached inside the housing such that a front end portion in the axial direction of the electronic pen protrudes from the opening portion of the housing, the core body comprising:

a core rod with conductivity that, in operation, receives a signal from a signal generation circuit; and a protection member that partially covers the core rod, wherein:

the core rod includes a pen tip portion on a front end side of the core rod, an installation portion on a rear end side of the core rod, and an axis portion that connects the pen tip portion and the installation portion, the protection member is located only on the pen tip portion and the axis portion of the core rod, the protection member covers a front end of the core rod, the axis portion of the core rod includes a front-side axis portion adjacent to the pen tip portion of the core rod, a rear-side axis portion adjacent to the installation portion of the core rod, and a middle axis portion that connects the front-side axis portion and the rear-side axis portion, and a diameter of the middle axis portion of the core rod is greater than a diameter of the front-side axis portion of the core rod.

2. The core body according to claim 1, wherein:

the core body includes a middle portion with a dielectric constant different from a dielectric constant of the protection member, the middle portion being provided around a side surface of the axis portion of the core rod such that the core rod is separated from the protection member.

3. The core body according to claim 2, wherein:

the protection member includes an insertion hole into which the core rod is inserted, an inner diameter of a part of the insertion hole corresponding to the axis portion of the core rod being longer than an outer diameter of the axis portion, and, when the core rod is inserted and installed into the insertion hole, a space as the middle portion is provided between the protection member and the axis portion.

4. The core body according to claim 1, wherein the protection member includes an insertion hole into which the core rod is inserted, a fitting portion projecting in a direction crossing an axial center and including a knurled side surface is provided on the rear end side of the axis portion of the core rod, and, when the core rod is inserted and installed into the insertion hole, the pen tip portion of the core rod contacts a front end part of the protection member that surrounds the insertion hole, and the fitting portion of the core rod contacts a rear end part of the protection member that surrounds the insertion hole.

5. The core body according to claim 1, wherein:

a core body holding portion to which the core body is attached is provided inside the housing, and the installation portion of the core rod of the core body is installed on the core body holding portion and electrically connected to the signal generation circuit.

6. The core body according to claim 1, wherein:

a front end portion of the protection member of the core body has a tapered shape.

7. The core body according to claim 1, wherein:

the core rod of the core body is formed from a metal material, and the protection member of the core body is formed from a resin material.

8. The core body according to claim 1, wherein:

the core rod of the core body is formed from stainless steel or brass.

9. The core body according to claim 1, wherein:

the protection member of the core body is formed from a resin material, and the protection member is formed by two-color molding in which a material used for a front end part and a material used for a part other than the front end part are different.

10. The core body according to claim 1, wherein:

the protection member of the core body is formed by two-color molding in which elastomer is used for a front end part and polyacetal is used for a part other than the front end part.

11. The core body according to claim 10, wherein:

the front end part formed by the two-color molding contains a conductive material.

12. The core body according to claim 1, wherein the protection member of the core body includes:

a dome-shaped front end member having an appearance of a cone shape with a roundish front end, the front end member including a large circular bottom-surface opening portion on a bottom surface, the front end member including a space inside, and a cylindrical extension member including a through hole in the axial direction.

13. A core body for an electronic pen, the core body being attached inside a housing of the electronic pen including an opening portion on one end portion in an axial direction of the electronic pen, the core body being attached inside the housing such that a front end portion in the axial direction of the electronic pen protrudes from the opening portion of the housing, the core body comprising:

a core rod with conductivity that, in operation, receives a signal from a signal generation circuit; and a protection member that partially covers the core rod, wherein:

the core rod includes a pen tip portion on a front end side of the core rod, an installation portion on a rear end side of the core rod, and an axis portion that connects the pen tip portion and the installation portion, the protection member is located only on the pen tip portion and the axis portion of the core rod, and the protection member covers a front end of the core rod, the core body includes a middle portion with a dielectric constant different from a dielectric constant of the protection member, the middle portion being provided around a side surface of the axis portion of the core rod such that the core rod is separated from the protection member, the protection member includes an insertion hole into which the core rod is inserted, an inner diameter of a part of the insertion hole corresponding to the axis portion of the core rod being longer than an outer diameter of the axis portion, a fitting portion projecting in a direction crossing an axial center is provided on the rear end side of the axis portion of the core rod, and, when the core rod is inserted and installed into the insertion hole, the pen tip portion of the core rod contacts a front end part of the protection member that surrounds the insertion hole, the fitting portion of the core rod contacts a rear end part of the protection member that surrounds the insertion hole, and a space as the middle portion is provided between the protection member and the axis portion.

14. A core body for an electronic pen, the core body being attached inside a housing of the electronic pen including an opening portion on one end portion in an axial direction of the electronic pen, the core body being attached inside the housing such that a front end portion in the axial direction of the electronic pen protrudes from the opening portion of the housing, the core body comprising:

a core rod with conductivity that, in operation, receives a signal from a signal generation circuit; and a protection member that partially covers the core rod, wherein:

the core rod includes a pen tip portion on a front end side of the core rod, an installation portion on a rear end side of the core rod, and an axis portion that connects the pen tip portion and the installation portion, the protection member is located only on the pen tip portion and the axis portion of the core rod, and the protection member covers a front end of the core rod, the core body includes a middle portion with a dielectric constant different from a dielectric constant of the protection member, the middle portion being provided around a side surface of the axis portion of the core rod such that the core rod is separated from the protection member, the protection member includes an insertion hole into which the core rod is inserted, a fitting portion projecting in a direction crossing an axial center is provided on the rear end side of the axis portion of the core rod, and, when the core rod is inserted and installed into the insertion hole, the pen tip portion of the core rod contacts a front end part of the protection member that surrounds the insertion hole, and the fitting portion of the core rod contacts a rear end part of the protection member that surrounds the insertion hole.

\* \* \* \* \*